Figure 16:
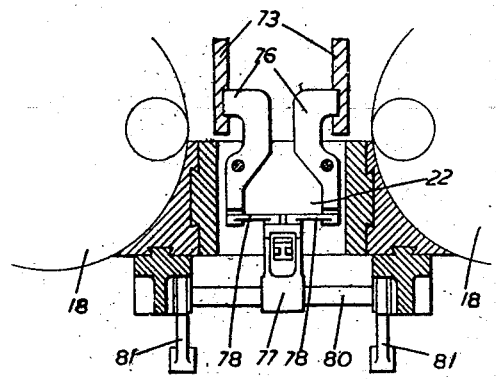

Nov. 29, 1949 C. D. BURNEY 2,489,954
RECOILLESS GUN WITH BREECH CLOSING MECHANISM
Filed Sept. 6, 1945 6 Sheets-Sheet 1
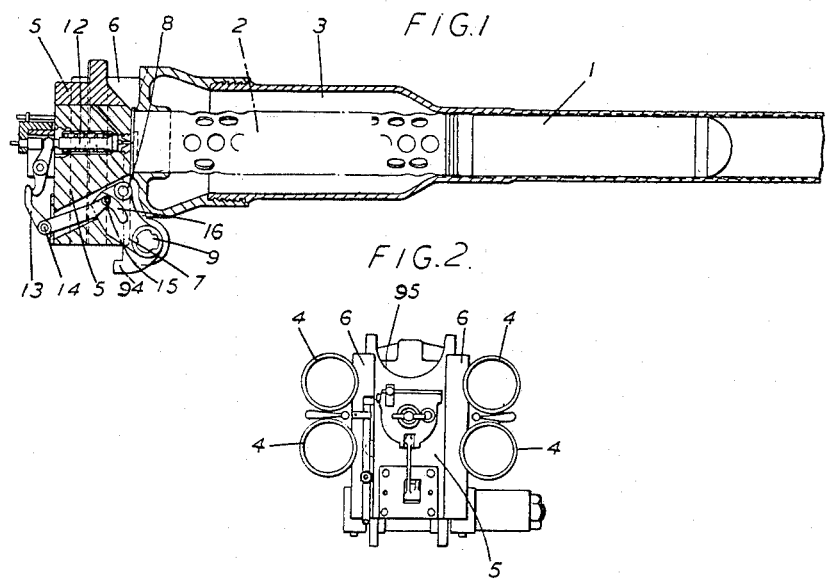
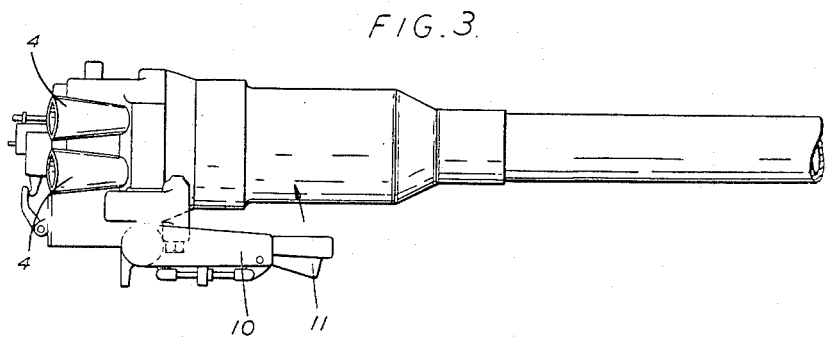
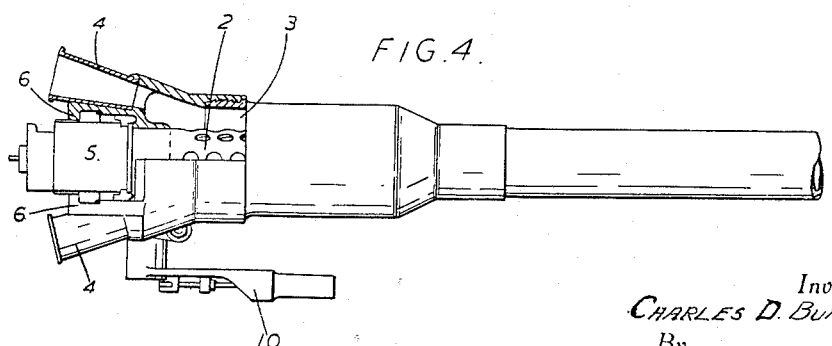
Inventor
CHARLES D. BURNEY
By
Cushman, Darby & Cushman
Attorneys Nov. 29, 1949 C. D. BURNEY 2,489,954
RECOILLESS GUN WITH BREECH CLOSING MECHANISM
Filed Sept. 6, 1945 6 Sheets-Sheet 2
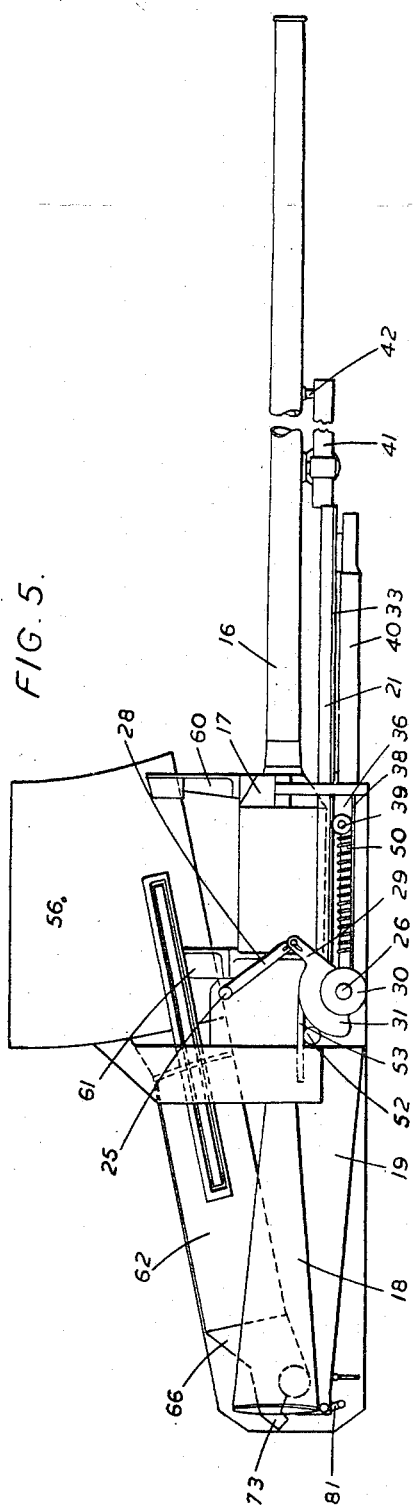
Inventor
CHARLES D. BURNEY
By
Cushman, Darby & Cushman
Attorneys Nov. 29, 1949  C. D. BURNEY  2,489,954
RECOILLESS GUN WITH BREECH CLOSING MECHANISM
Filed Sept. 6, 1945  6 Sheets-Sheet 3
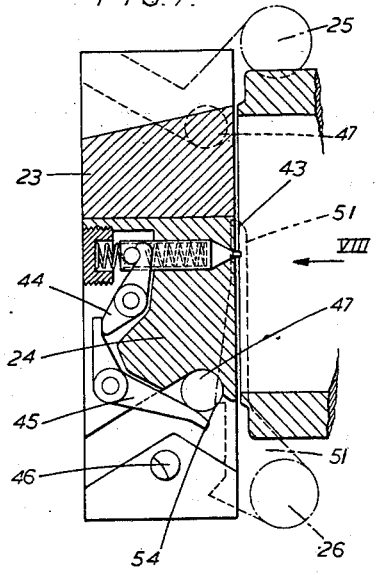
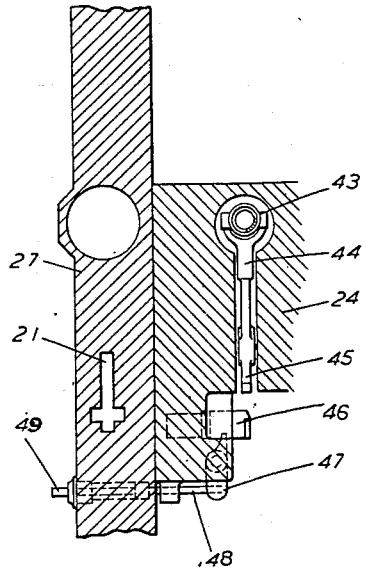
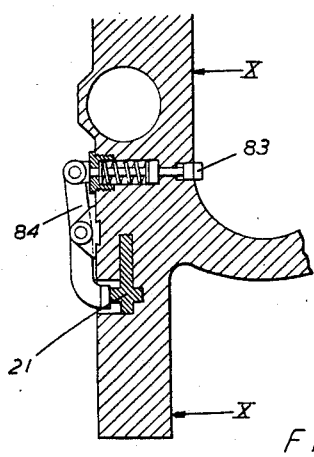
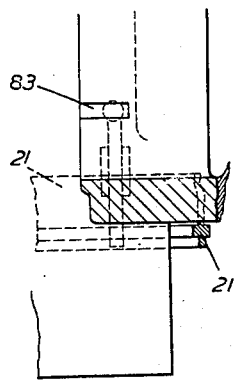
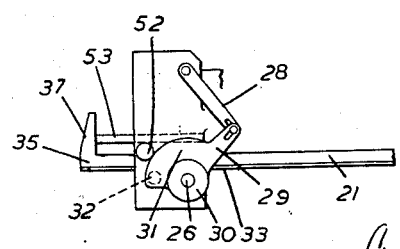

Nov. 29, 1949          C. D. BURNEY          2,489,954
RECOILLESS GUN WITH BREECH CLOSING MECHANISM
Filed Sept. 6, 1945          6 Sheets-Sheet 4
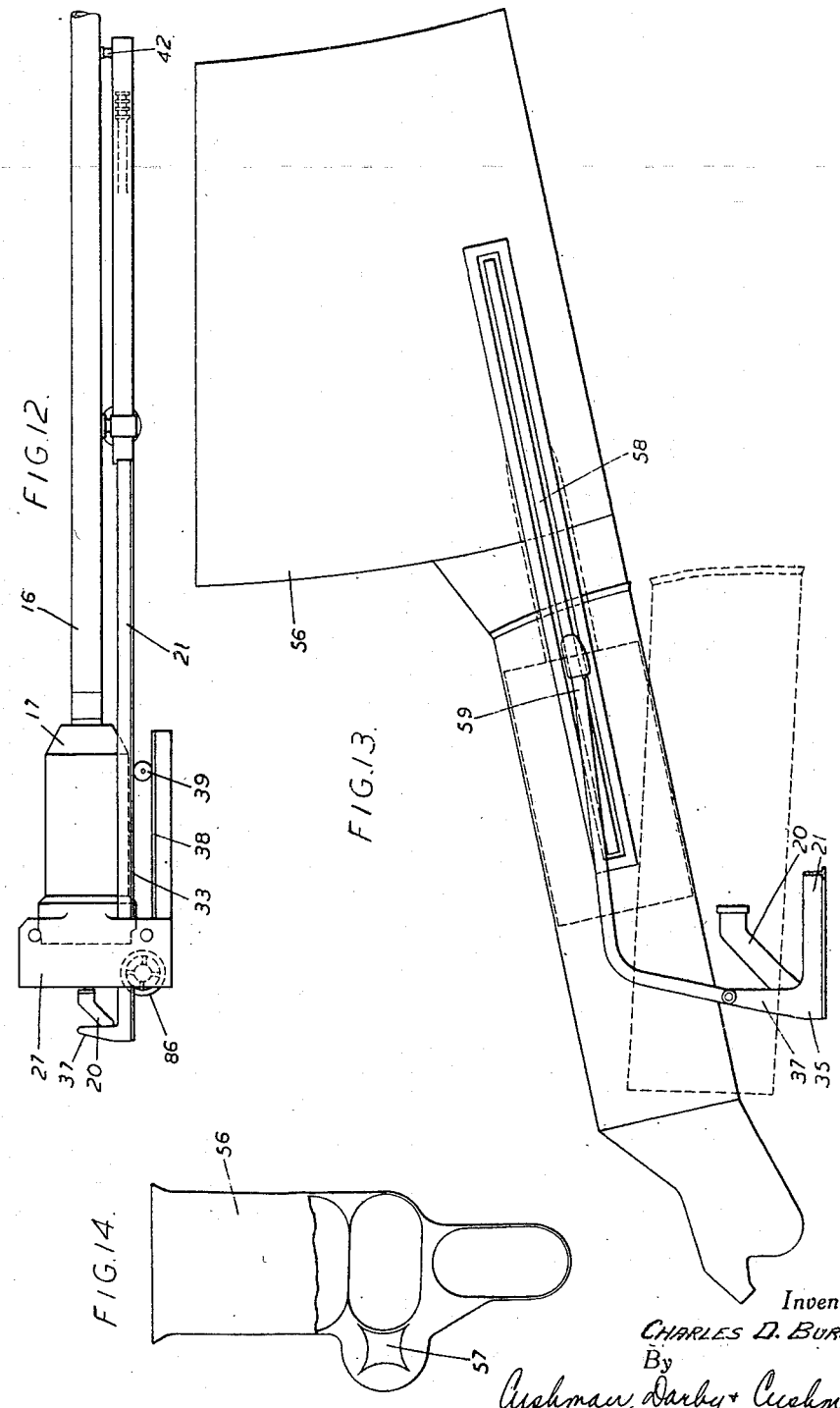

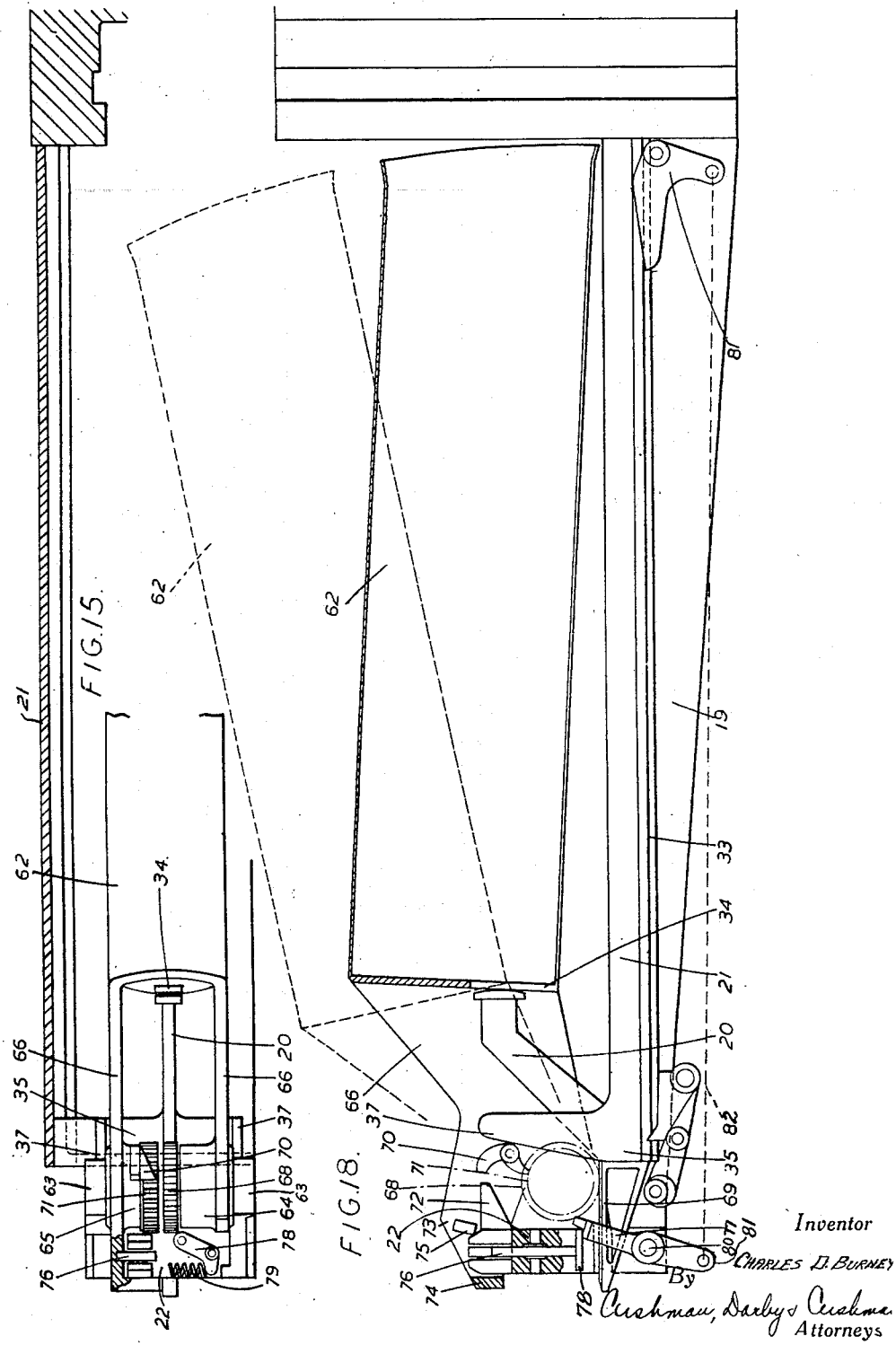

Inventor
CHARLES D. BURNEY
By
Cushman, Darby, Cushman
Attorneys

Patented Nov. 29, 1949

2,489,954

UNITED STATES PATENT OFFICE 2,489,954

RECOILLESS GUN WITH BREECH CLOSING MECHANISM

Charles Dennistoun Burney, Baynards Park, near Cranleigh, England

Application September 6, 1945, Serial No. 614,717
In Great Britain August 4, 1943

Section 1, Public Law, 690, August 8, 1946
Patent expires August 4, 1963

5 Claims. (Cl. 89—1.7)

The present invention relates to improvements in recoilless guns of the kind forming the subject matter of my concurrent application for Letters Patent Serial No. 552,347, filed September 1, 1944, having a breech chamber which includes the cartridge chamber and a gas space through which the explosion gases pass from the cartridge chamber to the atmosphere through one or more rearwardly directed gas nozzles, which produce a forward reaction counter-balancing to any desired extent up to 100%, the normal rearward recoil of the gun barrel.

In the embodiments described in the above-mentioned prior application the projectile and cartridge are loaded into the gun at a point between the gun barrel and a gas chamber forming a rearward extension of the barrel, but such an arrangement is not without disadvantages when quick firing, involving automatic loading, is desired. The object of the present invention is, therefore, to provide a recoilless gun of modified construction particularly adapted for quick firing with automatic loading.

According to the invention a recoilless gun in which the recoil shock is wholly or partially balanced by the reaction of rearwardly directed gases escaping from the breech chamber through a plurality of gas nozzles, is characterised in that the cartridge chamber is enlarged laterally and provided with a plurality of gas escape openings on opposite sides of the breech bore which receives the cartridge, which openings are fitted with gas discharge nozzles, between which are disposed one or more breech blocks sliding transversely in relation to the axis of the gun, adapted to be operated to close the breech. For example there may be one or more breech blocks.

Although in some cases the breech block or blocks may slide horizontally, in the preferred construction there are one or more breech blocks which slide vertically, and may be of normal construction.

The gun may be constructed for individual shot firing with manual loading or for quick firing with automatic mechanically operated loading, in which case gas may be tapped off from the barrel or from the gas discharge nozzles for the purpose.

In the case of guns using charges separate from the projectile the projectiles followed by the charge are loaded into the breech by one ramming operation, but in the case of fixed ammunition, in which the charge is normally contained in a casing into the mouth of which the projectile is fitted, a modified form of ammunition is required for use in accordance with this invention, since it is necessary for the cartridge chamber to be in free communication with the chambers having the rearwardly discharging gas nozzles, which would not be the case if fixed ammunition of the standard type were used. For use in guns according to the present invention, therefore, I may provide fixed ammunition in which the charge and projectile are assembled together as a single unit, as in standard fixed ammunition, but the other surface of the charge is exposed instead of being enclosed in a casing.

In carrying the invention into practice the breech chamber comprises a cartridge chamber which is enlarged laterally at as many peripheral points as there are to be gas discharge nozzles to form gas chambers leading to the gas discharge nozzles. The gas discharge openings are covered over within the gas chambers by grids or perforated members which may be constituted by the cartridge cases and are fitted externally with conical or like expansion nozzles directed rearwardly. Said nozzles may also be directed somewhat outwardly, so that the adjacent walls of adjacent nozzles are substantially parallel to one another and to the axis of the gun, and lie on either side of a central breech aperture through which the projectile and its propelling charge are loaded into the cartridge chamber. A suitable loading platform may be supported by the nozzles just below the breech aperture.

In regard to the modified construction of fixed ammunition for use with guns according to the present invention the cartridge cases may be of perforated sheet metal, but instead of enclosing the charge in a metal cartridge casing it may be supported by a central core rod which connects together the base plate containing the percussion cap and a metal spider surrounded by a ring into which the base of the projectile fits. The outer surface of the charge may be protected from atmospheric conditions by an envelope or covering of readily disruptible and consumable material, as, for example, cellophane film or metal foil.

The invention is not limited to guns which are 100% recoilless, for it may be applied to guns which are permitted to recoil to a limited extent and in some cases even to have a negative or forward recoil. Such guns may be produced by providing means for varying the effective throat area of the rearwardly directed gas nozzle or nozzles. This instead of tapping off gas pressure from the gas barrel or gas nozzles to operate automatic loading mechanism, such mechanism may be operated by the permitted recoil of the gun, as in an ordinary automatic gun, with the difference, however, that the recoil shock will be much less than the normal for any given size of gun. For example, a gun may be equipped with a recoil system capable of taking up to say 5% of the total recoil, the rest being balanced by the rearwardly discharging gases. Preferably the recoil system would embody an indicator to show exactly how much, if any, recoil takes place.

Thus, for instance, in the case of a 6" gun, the rearwardly discharging gases may balance the recoil to such an extent that the remaining recoil may be absorbed by a 2 pounder recoil system permitting a small extent of gun movement in relation to the carriage which can be indicated or registered.

It is important to provide means for accurately adjusting and indicating the recoil since it has been found that a small variation of gas nozzle area of say 1% will make a variation in muzzle velocity of some 1.7% and consequently the recoil should be adjustable to within ⅓ to ⅕ of 1%.

In order that the invention may be more fully understood and readily carried into practice, it is illustrated, by way of example only, in the accompanying drawings, in which:

Figure 1 is a longitudinal section of the breech end of a recoilless field gun according to the invention, with a manually operated sliding breech block, showing a round of fixed ammunition loaded into the breech, Figure 2 is an end elevation of the breech of the gun, Figure 3 is a side elevation of the breech end of the gun, Figure 4 is a plan view partly in section, Figure 5 is a general right hand side view in elevation of a 95 mm. recoilless gun according to the invention.

Figure 17:
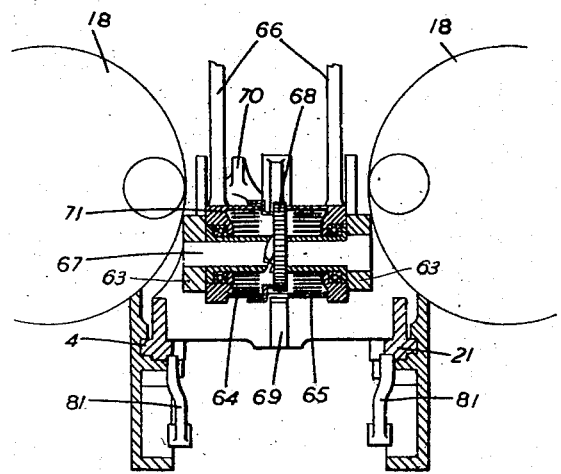

Figure 6 is a plan view,

Figure 7 is a detail sectional side view to a larger scale of the breech block, showing the firing and cocking mechanism, Figure 8 is a sectional rear view of the lower breech block and firing mechanism, Figure 9 is a sectional detail view of the double loading safety device, Figure 10 is a view thereof in a plane parallel to the rammer slides, in direction X—X, Figure 11 is a view in elevation showing the rammer slide adjustor, Figure 12 is a diagrammatic side view of the rammer slide operating mechanism, Figure 13 is a diagrammatic view to a larger scale illustrating the magazine extractor mechanism, Figure 14 is a diagrammatic view, illustrating the action of the magazine, Figure 15 is a detail plan view, partly in section of the loading trunk operating mechanism, Figure 16 is a detail view in end elevation and part section of the magazine trunk locking and tripping mechanism, Figure 17 is a cross-sectional view of the loading trunk operating mechanism and another part of the trunk lock tripping mechanism, and Figure 18 is a side elevation in section corresponding to Figure 15.

Referring to Figures 1-4 inclusive, the projectile 1 is carried by a cartridge case 2 having a perforated wall, and the chamber which accommodates the case 2, instead of fitting closely to the wall of the cartridge case is spaced therefrom to form a gas chamber 3 surrounding the cartridge case, into the rear end of which screw the throats of two pairs of symmetrically disposed expansion nozzles 4.

The nozzles 4 are arranged in vertically aligned pairs disposed in spaced relation, and between them is located the breech mechanism. This comprises a breech block 5 slidable vertically in guides 6, by means of a cam lever 7 carrying a bearing roller 8, which lever 8 is engaged in a slot in the lower part of the breech block 5. The shaft 9 on which lever 7 is mounted is adapted to be rotated by hand lever 10, with which is associated a locking grip 11 which locks the shaft 9 and lever 7 against accidental rotation.

The firing pin 12 is retracted into firing position during the final movement of lever 10, after the lower part of the breech block has risen into closed position, by lever arm 13 mounted on shaft 14, on which is also mounted a lever arm carrying a roller 15 engaged with a curved slot 16 in cam lever 7. The breech mechanism is equipped with any desired safety locks to prevent premature release of the firing pin, but such devices do not form part of this invention and therefore will not be described in detail.

The breech mechanism includes an extractor lever of semi-circular form which is engaged under the rim of the cartridge 2 when the breech is closed, and is swung angularly outwards when its tail piece 94 is struck by a tail piece on the hand lever 10 during the final movement of the hand lever after opening the breech.

In the upper end of the breech block 5 is formed a semi-circular recess 95 which registers with the breech opening when the breech is fully open and allows insertion of the round of ammunition.

It will be understood that the gun operates on firing in the manner described in the specification of my prior patent application Serial No. 552,347, the chamber 3 providing a reservoir for gases developed by the combustion of the charge contained in the cartridge case 2, and the gases discharging rearwardly through the nozzles 4, in such manner as to produce a forward reaction neutralising or substantially neutralising the backward recoil shock.

The above construction may be modified in various ways as may be required for guns of various calibres. For guns of heavy calibre a loading tray may be mounted in rear of the breech mechanism to receive the rounds of ammunition prior to entering them into the breech, and any suitable mechanism operated manually or automatically may be provided for ramming the rounds home into the breech before the breech block is closed. Many such arrangements are already known, and may be readily adapted for use in conjunction with the present invention.

An automatically loaded 95 mm. recoilless gun in accordance with the invention is illustrated by Figs. 5–18 of the drawings.

This gun, which can be installed in aircraft, may also be carried by a naval mounting or a self-propelled gun carriage. It is designed to fire ammunition having a perforated or skeleton cartridge case of oval section and employs a magazine in which the rounds are stacked with the major axes of their cartridge cases horizontal. It may, however, be modified to fire rounds which are circular in cross-section, or rounds comprising a pair of perforated or skeleton cartridge cases of round cross-section connected side by side at their bases by a common oval base piece having a cavity providing communication between said cases, one of said cases containing propellant and carrying the bullet which enters the barrel bore, and the other of said cases, which also contains propellant and is of a length equal to the first cartridge case and bullet together, entering the breech chamber above the barrel.

For convenience and economy in space cartridges with oval cases or bases will be stored with their major axis parallel, stacked one on the other with their flat faces in contact, and they will be loaded into the magazine in this manner. As however, they must be loaded into the breech of the gun with their major axes vertical, provision must be made for rotating the rounds before presentation to the breech mechanism.

The rounds are transferred from a magazine to the breech mechanism, with the aid of an angularly movable trunk into which the rounds are pulled individually from the magazine by extractor arms. When the trunk is loaded it is swung angularly downwards so as to align its forward end with the open breech, whereupon a rammer operated by a spring engages the base of the cartridge and pushes the round from the trunk into the breech. The trunk then rises automatically into alignment with the magazine ready for the extraction of the next round. The rammer is then pushed back to allow the breech to close and the breech of the gun is automatically closed ready for the next firing operation. A portion of the explosive gases is tapped off from the barrel to operate a piston and supply the energy for restoring the energy of the operating springs of the breech mechanism i. e. for raising and lowering the trunk, operating the rammer, and closing the breech blocks. The breech block is divided into two parts which slide vertically apart to admit the new round into the gun breech, the lower breech block being automatically locked in the open position until the new round is fully home in the breech ring. The breech blocks are then closed in the restoring spring and when fully closed a cocking rod is brought into line with a firing pin in the breech block and the gun is then ready for firing.

When the gas operated piston moves it compresses the restoring spring, as already mentioned; it also moves the rammer rearwardly into the pre-loading position and opens the breech blocks. When the breech opens, the spent cartridge case is extracted from the breech. During forward movement of the rammer, the magazine extractor arms move forward to engage the next round in the magazine ready to draw it down into the trunk as soon as the rammer starts its rearward stroke consequent upon firing taking place.

The loading trunk is raised and lowered by two springs operating through oppositely acting clutches, the said springs being wound up during the end of the rearward stroke of the rammer and during the initial portion of the forward stroke of the rammer respectively, and being released to operate on the trunk, after the rammer itself has come to rest, at the correct moments in relation to the action of the mechanism, by suitable trip devices.

The gun may be used for single shot firing or for automatic firing according to the setting of a control switch. Initial loading is effected manually, whereafter with automatic fire loading is automatic.

The gun and its various mechanisms will now be described in greater detail.

The barrel 16, which has the usual rifled bore, screws into a breech chamber 17, and, on firing, the chamber gases are discharged freely to atmosphere through the jet nozzles 18 screwed into the breech chamber. These jets combine with the rammer guide brackets 19 to support the overhang of the rammer 20 and rammer slides 21 in their rearmost pre-loading position. The rear ends of the nozzles 18 and rammer guide brackets 19 are connected together by an end plate 22.

On each side of the breech opening the breech chamber carries side plates 27 between which slide a pair of breech blocks 23 and 24, which slide vertically together to close the breech and move apart to open the breech. They are operated by a pair of short cranks whose rollers 47 are engaged in centrally disposed V-shaped cam slots in the faces of the breech blocks, said cranks being mounted on shafts 25 and 26 bushed in the adjacent breech side plates 27. At one end said shafts carry long cranks 28, 29 (Fig. 11) which have a pin and slot engagement with each other at their ends, and the lower shaft 26 also forms the spindle of a clock spring in cover box 30. The box 30 and crank arm 29 are integral with a quadrant plate 31 having a peripheral flange gear cut both internally and externally. When the lower shaft 26 is rotated by quadrant 31 in a clockwise direction the breech blocks 23, 24 are drawn together and the breech is closed, whilst when it is rotated in the opposite direction the crank arms 28, 29 straighten out and the breech blocks move apart to open the breech.

The quadrant plate 31 is rotated in clockwise direction to close the breech by the spring in casing 30 and is rotated in breech opening direction by gear 32 (Fig. 11) meshing with the internal rack on the peripheral flange of quadrant plate 31. This gear 32 is rotated by a rack 33 formed along one of the rammer slides 21. There are a pair of these rammer slides 21 passing through slots in the breech chamber side plates 27 on opposite sides of the breech, the forward portions of said slides having racks 33 on their lower surfaces and the rear portions being connected by a cross piece 35 (Figs. 12 and 13) from which the rammer 20 projects forwardly and the magazine extractor arms 37 project upwardly.

Supported beneath the breech chamber 17 and parallel to the forward portions of the rammer slides 21 are stationary racks 38, and between the racks 33 and 38 are gears 39 (Figs. 5 and 12). The gears 39 are mounted on a cross piece 36 carried by the end of tube 40 connected to the piston rod fitting in a gas cylinder 41 mounted beneath the barrel 16, and communicating with the barrel bore through a valve 42. When a bullet passes the valve 42, gas passes into cylinder 41 and forces the piston rod and tube 40 rearwardly. In consequence of which, and owing to the double racks 33, 38 and gears 39, the rammer slides 21 are driven rearwardly for a distance twice the stroke of the piston. During such rearward movement of the racks 33, the gear 32 (Fig. 11) is engaged by one of racks 33 and is rotated.

In consequence of the rotation of gear 32 quadrant 31 is rotated in a counterclockwise direction to open the breech. At the same time, the spring in box 30 is wound up ready to supply the restoring force for closing the breech again. Preferably the value 42 is adjustable or exchangeable so that the size of the gas port can be varied to give the most satisfactory results, or to bring an alternative gas port into use in the event of temporary blockage of or damage to the valve in use.

At the end of the stroke of the gas piston the gases escape from cylinder 41 to atmosphere and the valve 42 is automatically locked in open position to avoid gas compression on the return stroke.

Referring to Figures 7 and 8, the cocking and firing mechanism is housed in the lower breech block 24 and comprises a spring loaded tubular firing pin 43 fitted in a bore in the block 24, adapted to be retracted by a pivoted lever 44 mounted in a vertical slot in the breech block. Bearing on the tail of lever 44 is one arm of a pivoted cocking lever 45, whose other arm is adapted to engage in cocked position behind a cocking pin 46 mounted in the breech block, which can be moved into and out of alignment with the arm of cocking lever 45 by a pivoted lever 47a, connected at its opposite end to a pin 48. When the breech block 24 is in closed position the pin 48 comes into alignment with a spring loaded firing plunger 49 in the breech block side plate 27, which when released moves forward, to rock lever 47a and thus disengage cocking pin 46 from cocking lever 45. Firing pin 43 is therefore released to move forward under the action of its spring, to strike the cartridge cap and fire the shot.

The firing mechanism is cocked automatically by downward movement of lower breech block 24, the roller 47 running in the V-shaped cam slots of the block depressing the tail of the cocking lever 45, towards the end of the downward movement of breech block 24, until it engages behind cocking pin 46.

In addition to driving the rammer slides 21 rearwardly, and winding up the clock spring in quadrant box 30, the piston 40, in its rearward movement, also compresses a spring 50 disposed beneath the breech chamber which encircles a guide rod and is housed in a tube extending rearwardly from the piston rod cross-piece between gears 39.

As already mentioned, the rammer 20 is mounted on a cross-piece 35 at the rear ends of the rammer slides 21 and as the breech opens, it is carried rearwardly into a position lying behind the next round obtained from the magazine, ready to be loaded into the breech. After completing their rearward movement the rammer slides 21 move forwards again under the energy of the restoring spring 50 and carry the round into the breech. As soon as the round is home in the breech the extractor levers 51 (Fig. 7) are engaged by the round and pressed into the extractor housing, thus releasing the bottom breech block 24 which has been locked in the fully open position by the detent noses 54 of said extractor levers 51 engaged in recesses in the breech block. The breech blocks 23, 24 then commence to close under the action of quadrant spring in box 30, and in so doing a gear 52 meshing with an external rack round quadrant 31 projects rearwardly the rammer adjuster 53 (Fig. 11), which engages one of the magazine extractor arms 37 and pushes the rammer 20 back sufficiently to clear the breech blocks 23, 24 as they close.

In order to permit closure of the breech blocks 23, 24 when the rammer slides 21 are at rest the gear 32 is rotated from the rack 33 on one of the rammer slides 21 through the intermediary of a gear wheel associated with the gear 32 through a one way clutch, which enables the rammer slides 21 to continue moving on the rearward stroke after the breech blocks have opened, and the breech blocks 23, 24 to close after the rammer slides 21 have completed their forward stroke.

The operation of the feeding mechanism will now be described. The magazine 56, as shown in Fig. 14, is designed to contain five rounds stacked with their major axes horizontal. The lower part of the magazine is constructed so as only to allow passage of single rounds with their axes vertical. In order to rotate the rounds, at the side of the magazine is an enlargement containing a rotatable member 57 having longitudinal grooves or recesses of arcuate cross-section which engage one edge of the lowermost round and enable this edge to fall vertically by gravity into the constricted part of the magazine whilst its other edge is retained in the upward position. This gravity operated means for rotating the rounds may be replaced by a positively actuated device operated mechanically by the breech mechanism, if desired. The constricted part of the magazine into which the next round to be fired falls has slots 58 (Fig. 13) through which magazine extractors 59 engage the round. These extractors 59 are articulated to the magazine extractor arms 37, so that as the rammer slides 21 travel rearwardly the round is drawn through the outlet opening of the magazine.

The magazine 56 is supported over the breech chamber by front and rear brackets 60, 61 (Fig. 5), and the rounds are transferred from the magazine into a loading trunk 62 which receives the individual rounds from the magazine and places them in line with the bore of the gun ready for loading by the rammer 20. To this end the loading trunk 62 is pivotally mounted at its rear end between side cheeks 63 of the end plate 22, so that it is capable of angular movement between a position in which its forward end is in alignment with the magazine discharge opening (dotted in Figure 18) into a position in which it is in alignment with the barrel bore. It is adapted to be locked in either of these two positions as hereinafter described, and since its movements have to take place at moments when the rammer slides are stationary, it is raised and lowered by energy stored up in right and left hand clock springs 64, 65 (Figs. 15 and 16). The trunk 62 is carried by arms 66, 66 mounted with the aid of ball bearings (Fig. 7) on a spindle 67 carrying a gear wheel 68, the hub of which is formed with oppositely facing claw clutch elements. The springs 64 and 65 encircle the spindle 67 between the sides of gear 68 and the supporting arms 66 of trunk 62. The outer ends of the springs 64, 65 are attached to enclosing casings which are integral with arms 66, 66, whilst their inner ends are attached to hub pieces having clutch claw elements adapted to co-operate with those which face them on the hub of gear 68, which latter is splined to spindle 67 so as to be capable of sufficient axial movement to engage with either of the spring clutches and disengage from the other one. Thus according as gear 68 is rotated in one direction or the other, spring 64 or spring 65 will be wound up. The gear wheel 68 is adapted to be driven by a short rack 69 projecting from the cross piece 35 connecting together the rear ends of the rammer slides 21. This rack engages the gear wheel 68 after the rammer slides 21 have been driven back to the necessary extent. During the rearward stroke of the rammer slide 21 the right hand trunk operating spring 65 is wound up, and during the return stroke the spring 64 is wound up.

After they have been wound up each spring unwinds on the next rammer slide stroke and thus raises or lowers the trunk 62.

Mounted on a pivot pin projecting from one of the arms 66 of the trunk 62 is a pawl 70 which can engage with an annular rack 71 attached to one side of gear 68 and freely encircling the edge of the box of adjacent left hand spring 64. This pawl serves to prevent unwinding of spring 64 when the rammer slide rack 69 disengages from gear 68 after its initial backward movement. A fixed abutment 72 strikes the tail of the pawl 70 as soon as the trunk 62 has moved into its raised position, so that any tension still remaining in the spring 64 after it has done its work is released.

The arms 66, 66 have rearwardly extending locking pieces 73, connected by a cross bar 74, in each of which are formed a pair of recesses 75 engageable by the latch ends of levers 76 pivoted to cross-piece 22, to lock the trunk 62 either in its downward loading position, or in its raised position aligned with the mouth of the magazine 56.

These levers 76 are adapted to be tripped by a trip lever 77, the nose of which bears against the long arms of small bell crank levers 78 pivoted to the tails of levers 76, against the pressure of a spring 79 acting between the short arms of the bell-crank levers. When said bell-crank levers are pressed with their long arms in line with one another the levers 76 are rocked on their pivots and their latch ends disengaged from the recesses 75 in locking pieces 73 with which they happen to be engaged.

The trip lever 77 is mounted on a spindle 80 having crank arms 81 connected by rods 82 to one of the arms of pivoted bell-crank levers 81a; the other arms of which are adapted to be depressed by contact with a suitable cross piece at the forward end of the rammer slide structure. At the rearward end of the rammer slide stroke the trip lever 77 is directly engaged and operated by abutments on the rear end of the rammer slide structure. Thus at both ends of the stroke of the rammer slide structure trunk trip control means are operated to trip locking levers 76 and release the trunk 62 for angular movement, whilst the trunk 62 remains locked during the rearward rammer movement which transfers the cartridge from the magazine 56 to the trunk 62, and during the forward rammer travel which transfers the round from the trunk 62 into the gun breech.

It will be understood that the rounds are pushed out of the loading trunk 62 into the gun breech as the rammer slide structure executes its forward stroke, the trunk being slotted longitudinally at 34 to allow passage of the rammer 20.

As a safety device a double loading stop device is provided at the side of the breech chamber, which comprises an arcuate feeler 83 (Figs. 9 and 10) mounted on the inner surface of the breech chamber wall to make contact with the cartridge case, which is mounted on a pin articulated to a pivoted lever 84 the free end of which is adapted to engage in a notch in the rammer slide 21 when this is extended fully to the rear, and the feeler 83 is pressed outwardly. Thus in the event of a round failing to be ejected and remaining in the breech the feeler 83 will not move inwards and consequently the rammer slide structure will be locked in its rearward position against the action of the restoring spring 50, so that double loading and possible damage to the mechanism is prevented.

The gun is provided with any suitable adjustable control means whereby firing can take place either by single shots or by automatically repeated shots, said means operating when required to lock the rammer slide structure.

For manual loading for single shot firing, and at the commencement of automatic firing, a hand wheel 86 (Fig. 12) is provided which operates through a rack on the rammer slide structure to slide it rearwardly and thus perform the initial stage of loading.

Various modifications may be made in the above described mechanism without departing from the invention, not only in its details but also in its general arrangements.

I claim:

1. In a gun, a barrel for a projectile, a chamber rearwardly of the barrel, the chamber having a cross-sectional area greater than the barrel bore and being provided with a pair of gas discharge openings to atmosphere spaced from each other along a line extending transversely of the chamber, a gas discharge nozzle fitted in each opening, the chamber having a breech opening between the gas discharge nozzles which is of less area than the cross-sectional area of said chamber and a breech closing mechanism at the rear portion of the chamber for the breech opening between the gas discharge openings.

2. A gun of the character defined in claim 1 wherein the gas discharge openings are provided in the rear wall of the chamber and the nozzles have their axes divergent.

3. A gun of the character described in claim 1 wherein the breech mechanism includes a block movable transversely of the gun.

4. A gun of the character described in claim 1 wherein the breech mechanism comprises two elements movable toward and from each other transversely of the gun.

5. A gun of the character described in claim 1 including a magazine above the chamber, and means to move a projectile from the magazine to firing position within the chamber and barrel including a rammer movable along a path between the gas discharge openings.

CHARLES DENNISTOUN BURNEY.

REFERENCES CITED

The following references are of record in the file of this patent:

UNITED STATES PATENTS

| Number | Name | Date |
| --- | --- | --- |
| 160,691 | MacNeil | Mar. 9, 1875 |
| 702,240 | Noble | June 10, 1902 |
| 747,848 | Benet et al. | Dec. 22, 1903 |
| 1,487,214 | Dezendorf | Mar. 18, 1924 |
| 1,525,065 | Browning | Feb. 3, 1925 |
| 1,805,601 | Ross | May 19, 1931 |

FOREIGN PATENTS

| Number | Country | Date |
| --- | --- | --- |
| 468,583 | Great Britain | July 8, 1937 |

OTHER REFERENCES

Pages 232–7, Army Ordnance, Sept.-Oct. 1945.